(12) United States Patent
    Hou

(10) Patent No.: US 12,594,527 B2
(45) Date of Patent: Apr. 7, 2026

(54) METHOD OF MAKING A CARTRIDGE FILTER

(71) Applicant: A. O. Smith Corporation, Milwaukee, WI (US)

(72) Inventor: Yizhi Hou, Milwaukee, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 381 days.

(21) Appl. No.: 18/560,542

(22) PCT Filed: May 18, 2022

(86) PCT No.: PCT/US2022/029835
    § 371 (c)(1),
    (2) Date: Nov. 13, 2023

(87) PCT Pub. No.: WO2022/245945
    PCT Pub. Date: Nov. 24, 2022

(65) Prior Publication Data
    US 2024/0252990 A1      Aug. 1, 2024

Related U.S. Application Data

(60) Provisional application No. 63/190,057, filed on May 18, 2021.

(51) Int. Cl.
    *B01D 63/10*        (2006.01)
    *B01D 61/02*        (2006.01)
    (Continued)

(52) U.S. Cl.
    CPC ........... *B01D 61/08* (2013.01); *B01D 61/025* (2013.01); *B01D 61/04* (2013.01); *B01D 63/10* (2013.01);
    (Continued)

(58) Field of Classification Search
    CPC ...... B01D 61/08; B01D 61/025; B01D 61/04; B01D 63/10; B01D 63/101;
    (Continued)

(56) References Cited

U.S. PATENT DOCUMENTS

| | | | |
|---|---|---|---|
| 8,506,807 B2 | 8/2013 | Lee et al. | |
| 12,090,442 B2 * | 9/2024 | Hou ..................... | B01D 39/083 |

(Continued)

FOREIGN PATENT DOCUMENTS

| | | |
|---|---|---|
| CN | 105333222 A | 2/2016 |
| CN | 207158943 U | 3/2018 |

(Continued)

OTHER PUBLICATIONS

International Search Report and Written Opinion for Application No. PCT/US2022/029835 dated Jul. 29, 2022 (18 pages).

(Continued)

*Primary Examiner* — Madeline Gonzalez
(74) *Attorney, Agent, or Firm* — Michael Best & Friedrich LLP

(57)        ABSTRACT

A cartridge filter includes a feedwater inlet, a first outlet and a second outlet, a tube arranged at the center of the cartridge filter, an interior volume of the tube being in fluid communication with the first outlet, and a spiral wound filter assembly extending radially outward from the central tube and including a prefilter, a reverse osmosis filter, and a postfilter. The prefilter is located radially outward from the reverse osmosis filter and the postfilter.

13 Claims, 5 Drawing Sheets

(51) Int. Cl.

| | |
|---|---|
| *B01D 61/04* | (2006.01) |
| *B01D 61/08* | (2006.01) |
| *C02F 1/28* | (2023.01) |
| *C02F 1/44* | (2023.01) |
| *C02F 101/12* | (2006.01) |
| *C02F 101/32* | (2006.01) |
| *C02F 101/38* | (2006.01) |

(52) U.S. Cl.
    CPC ............ *B01D 63/101* (2022.08); *C02F 1/283* (2013.01); *C02F 1/441* (2013.01); *B01D 2311/04* (2013.01); *B01D 2313/042* (2022.08); *B01D 2313/44* (2013.01); *B01D 2313/901* (2022.08); *C02F 2101/12* (2013.01); *C02F 2101/322* (2013.01); *C02F 2101/38* (2013.01)

(58) Field of Classification Search
    CPC .......... B01D 2311/04; B01D 2313/042; B01D 2313/44; B01D 2313/901; B01D 39/083; B01D 39/1623; B01D 39/1692; B01D 39/2065; B01D 2239/065; B01D 2239/069; B01D 2239/083; B01D 2311/06; B01D 2311/2649; B01D 36/02; B01D 29/15; C02F 1/283; C02F 1/441; C02F 2101/12; C02F 2101/322; C02F 2101/38; C02F 2201/006
    USPC .... 210/652, 321.64, 321.74, 321.76, 321.78, 210/321.79, 321.8, 321, 83, 321.85, 210/321.87, 321.88, 321.89, 490, 493.4, 210/497.1, 314, 342, 338
    See application file for complete search history.

(56)         References Cited

U.S. PATENT DOCUMENTS

| | | | |
|---|---|---|---|
| 2011/0062076 A1* | 3/2011 | Lee ........................ | B01D 63/10 |
| | | | 210/457 |
| 2012/0111787 A1 | 5/2012 | Hou | |
| 2015/0060359 A1 | 3/2015 | Wang et al. | |
| 2015/0101987 A1 | 4/2015 | Yeh et al. | |
| 2018/0311600 A1 | 11/2018 | Dani et al. | |
| 2019/0388839 A1 | 12/2019 | Sun et al. | |

FOREIGN PATENT DOCUMENTS

| | | |
|---|---|---|
| CN | 108654391 A | 10/2018 |
| CN | 111453872 A | 7/2020 |
| JP | 5213311 B2 | 6/2013 |

OTHER PUBLICATIONS

Liu et al., "Adsorptive removal and oxidation of organic pollutants from water using a novel membrane", Chemical Engineering Journal, Abstract, Feb. 1, 2010, vol. 156, Issue 3, Lab of Industrial Ecology and Environmental Engineering, MOE, Department of Environmental Science and Engineering, Dalian University of Technology, 116024 Dalian, China (3 pages).

\* cited by examiner

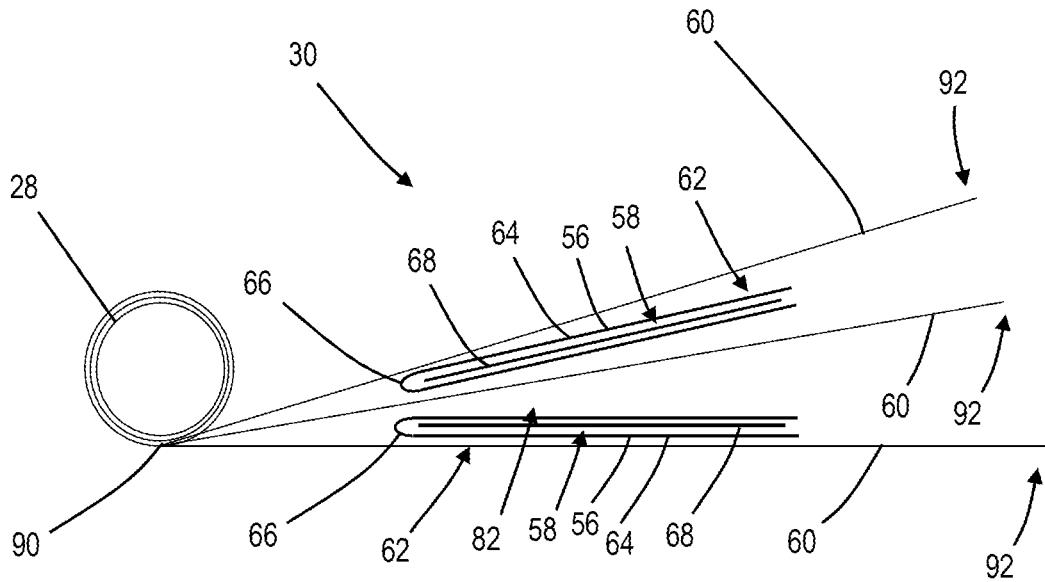
FIG. 2
FIG. 3
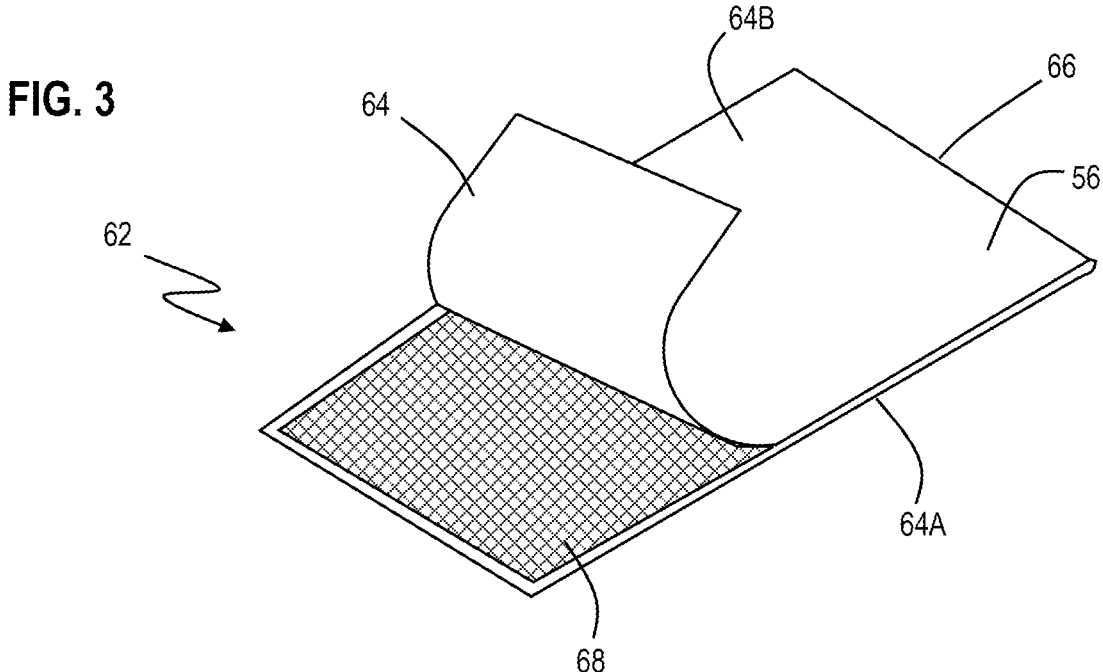

METHOD OF MAKING A CARTRIDGE FILTER

CROSS-REFERENCE TO RELATED APPLICATION(S)

This application is a national phase entry of PCT/US2022/029835, filed on May 18, 2022, which claims priority to US 63/190057, filed on May 18, 2021, the entire contents of each of which are incorporated herein by reference.

BACKGROUND

The present disclosure relates to cartridge filters and more particularly relates to cartridge filters having reverse osmosis filters and carbon filters for filtering a liquid therethrough.

In reverse osmosis filtration, water passes through pores of a membrane via high pressure. The pores are sized to prohibit passage of many materials (e.g., dissolved solids, minerals, salts, VCOs) within the water such that the water is separated into concentrate which is water with high concentration of such materials and permeate with is pure water. Such reverse osmosis filtration results in purified water from raw water sources such as wells, seas, or rivers.

SUMMARY

In one embodiment, a cartridge filter includes a feedwater inlet, a first outlet and a second outlet, a tube arranged at the center of the cartridge filter, an interior volume of the tube being in fluid communication with the first outlet, and a spiral wound filter assembly extending radially outward from the central tube and including a carbon prefilter, a reverse osmosis filter, and a carbon postfilter. The carbon prefilter is located radially outward from the reverse osmosis filter and the carbon postfilter.

In some embodiments, the cartridge filter includes an activated carbon fiber cloth having a first portion that forms the postfilter and a second portion that forms the prefilter.

In some embodiments, the cartridge filter includes a plurality of continuous strips of activated carbon fiber cloth, each one of the plurality of continuous strips having a first portion at least partially forming the postfilter and a second portion at least partially forming the prefilter.

In some embodiments, the cartridge filter includes a membrane sheet folded at a fold to form an inner channel. The inner channel provides a feedwater flow path of the reverse osmosis filter. An outer surface of the folded membrane sheet is disposed against the first portion of one of the plurality of continuous strips.

In some embodiments, the membrane sheet is a first membrane sheet and the cartridge filter additionally includes a second folded membrane sheet. An outer surface of the second folded membrane sheet is disposed against the first portion of said one of the plurality of continuous strips opposite the outer surface of the first folded membrane sheet. An adhesive joint between the outer surface of the first folded membrane sheet and the outer surface of the second folded membrane sheet along three edges forms an outer channel. The first portion of said one of the plurality of continuous strips is arranged within the outer channel. The outer channel provides a permeate flow path of the reverse osmosis filter and a flow path of the carbon postfilter.

In some embodiments, the adhesive joint extends across said one of the plurality of continuous strips to prevent direct fluid flow between the first and second portions of said one of the plurality of continuous strips.

In some embodiments, the feedwater flow path has a flow path entrance arranged opposite the fold, the flow path entrance being open to the carbon prefilter to receive feedwater therefrom.

In some embodiments, the first and second edges of the inner channel extending between the flow path entrance and the fold of the membrane sheet are at least partially sealed by adhesive joints.

In some embodiments, the feedwater flow path has a concentrate exit adjacent the fold at one of the first and second edges of the inner channel. The concentrate exit is in fluid communication with the second outlet.

In some embodiments, fluid received into the cartridge filter through the feedwater inlet is directed to flow through the carbon prefilter in a radially inward direction.

In some embodiments, fluid received into the cartridge filter through the feedwater inlet is directed to flow through the reverse osmosis filter in an inwardly spiraling direction.

In another embodiment, a cartridge filter has a carbon postfilter integrated within a permeate side of a reverse osmosis filter. The permeate side of the reverse osmosis filter consists of a plurality of activated carbon fiber cloth strips, each arranged between spaced-apart water permeable membranes.

In some embodiments, the activated carbon fiber cloth strips are configured to transmit a flow of permeate water in a direction that is perpendicular to a thickness direction of the strips.

In some embodiments, the activated carbon fiber cloth strips have a thickness in a range of 0.2 mm to 0.6 mm, when measured under a pressure of one atmosphere.

In some embodiments, the activated carbon fiber cloth strips are of a non-woven construction.

In some embodiments, the activated carbon fiber cloth strips are of a felt construction.

In some embodiments, the plurality of activated carbon fiber cloth strips define a carbon prefilter for the reverse osmosis filter.

In some embodiments, the carbon postfilter is located radially inward from the reverse osmosis filter.

Yet another embodiment discloses a method of making a cartridge filter containing a carbon prefilter, a reverse osmosis filter, and a carbon postfilter. A plurality of activated carbon fiber cloth strips are provided, each having a first edge, a second edge parallel to and spaced apart from the first edge, a third edge extending between ends of the first and second edges, and a fourth edge parallel to and spaced apart from the third edge and extending between the first and second edges. The first edges of the plurality of activated carbon fiber cloth strips are joined to a tube. A plurality of folded membrane assemblies are provided, each folded membrane assembly having a feedwater net arranged within a folded-over reverse osmosis membrane. The plurality of folded membrane assemblies are interleaved with the plurality of activated carbon fiber cloth strips such that folded ends of the folded membrane assemblies are located adjacent to the tube and open ends of the folded membrane assemblies opposite the folded ends are located between the folded ends and the second edges. The third and fourth edges of the activated carbon fiber cloth strips are sealed to adjacent ones of the plurality of folded membrane assemblies between the folded ends and the open ends of the folded membrane assemblies. The activated carbon fiber cloth strips are sealed to adjacent ones of the plurality of folded membrane assemblies along the open ends of the folded membrane assemblies. The plurality of folded membrane assemblies and those portions of the plurality of activated carbon fiber cloth strips located between the first edges and the open ends are spirally wound around the tube to form an integrated reverse osmosis filter and carbon postfilter. Those portions of the plurality of activated carbon fiber cloth strips located between the open ends and the second edges are spirally wound around the integrated reverse osmosis filter and carbon postfilter to form a carbon prefilter.

In some embodiments, those portions of the plurality of activated carbon fiber cloth strips located between the open ends and the second edges are spirally wound around the integrated reverse osmosis filter and carbon postfilter for at least three complete revolutions.

In some embodiment, the method further includes sealing at least a portion, but less than the entirety, of an edge of each of the folded membrane assemblies. Said edge extends between the folded end and the open end.

In some embodiments, the method further includes inserting the carbon prefilter, reverse osmosis filter, and carbon postfilter into a cartridge having a feedwater inlet so as to provide a fluid flow path between the feedwater inlet and an outer periphery of the carbon prefilter.

Features and parameters of the disclosure will become apparent by consideration of the following detailed description and accompanying drawings.

BRIEF DESCRIPTION OF THE DRAWINGS

FIG. 2 is a schematic end view of a partially disassembled cartridge filter illustrating folded membrane assemblies and continuous strips of carbon fiber cloth in the cartridge filter.

FIG. 3 is a partially deconstructed perspective view of one of the unrolled, folded membrane assemblies shown in FIG. 2.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
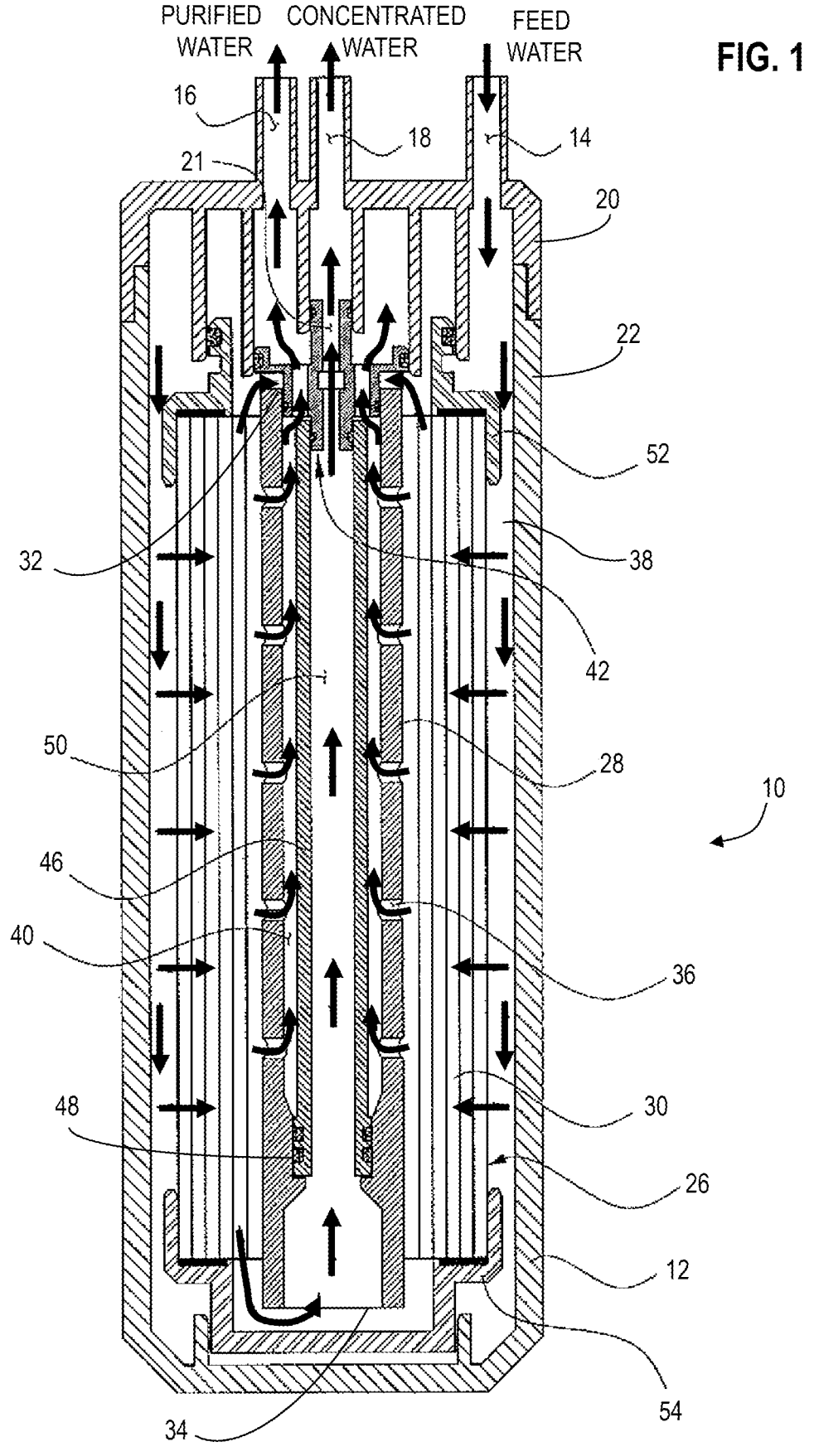
FIG. 1 is a cross-sectional view of a cartridge filter having a center tube and a spiral wound filter assembly positioned within a cartridge housing and illustrates fluid flow paths through the cartridge filter.

FIGS. 1-7 show a cartridge filter 10 in various states of assembly. FIG. 1 illustrates a cross-section of the cartridge filter 10. The cartridge filter 10 is generally cylindrical and includes a filter housing 12 provided with a feedwater port 14, a purified water port 16, and a concentrated water port 18 at an end of the filter housing. The feedwater port 14 is a feedwater inlet for introducing feedwater into the cartridge filter 10 and is located radially outward of the purified water port 16 and the concentrated water port 18. The purified water port 16 is a first outlet port and carries purified water out of the cartridge filter 10. The concentrated water port 18 is a second outlet port and carries concentrated water that is separated from the purified water out of the cartridge filter 10. The concentrated water port 18 is generally aligned with the central axis of the cartridge filter 10 and is therefore located radially inward of the feedwater port 14 and the purified water port 16. As shown, the housing 12 includes a separable cover 20 and body 22 and the three ports 14, 16, 18 are incorporated into the cover 20.

A filter 26 is accommodated in the filter housing 12 and includes a central tube 28 and a spiral wound filter assembly 30 wrapped radially about the outside of the central tube 28. The central tube 28 is a hollow tube having open ends 32, 34 at first and second lengthwise extents and located centrally within the wound filter assembly 30. The central tube 28 additionally includes sets of radial through holes 36. The term "radial" indicates that the through holes 36 extend from an outside of the central tube 28 to the hollow interior volume of the central tube 28 in the radial direction (i.e., perpendicular to the longitudinal axis of the central tube 28) such that water flowing through the through holes 36 flows in the radial direction. Each set of through holes 36 includes a plurality (e.g., 2, 3, 4, 5) of through holes 36 arranged axially along the central tube 28 between the open ends 32, 34. There are a plurality of sets of through holes 36, the sets being spaced circumferentially around the central tube 28.

The filter assembly 30 includes multiple, wrapped layers and purifies the feedwater introduced through the feedwater port 14 as the feedwater passes radially inwardly from an outer periphery 38 of the filter 10, through the filter assembly 30, and toward the central tube 28. The filter assembly 30 separates the feedwater into purified water and concentrated water, with the purified water being the water that passes through the multiple layers and through the axial through holes 36 of the central tube 28. A purified water flow channel 40 defined within the central tube 28 is in fluid communication with the purified water port 16 and directs the purified water through an outlet manifold 42 and toward the purified water port 16. The concentrated water does not pass through the multiple layers of the filter assembly 30 to the central tube 28 but instead drains out through the lengthwise extents of the filter assembly 30, flowing from there into the open end 34 of the central tube 28. The filter assembly 30 is described in greater detail below with respect to FIGS. 2-7.

A concentrated water pipe 46 having open ends is arranged within the central tube 28 to be radially spaced from the inner surface of the central tube 28. As shown, the concentrated water pipe 46 is arranged concentrically with the central tube 28 and is supported at a lower end by a sealing arrangement 48 with the central tube 28 and with the outlet manifold 42 at the upper end. The concentrated water pipe 46 defines a concentrated flow channel 50 in a central portion thereof. The purified water flow channel 40 is defined in the annular (i.e., outer coaxial) region between an outer surface of the concentrated water pipe 46 and an inner surface of the central tube 28. The concentrated water flowing into the open end 34 of the central tube 28 is directed into the concentrated flow channel 50 and is prohibited from passing to the purified water flow channel 40.

The outlet manifold 42 is installed at the upper end of the concentrated water pipe 46 and the central tube 28, thereby directing the filtered and purified portion of the feedwater in the purified water flow channel 40 to the purified water port 16. The manifold 42 likewise directs the concentrated water in the concentrated flow channel 50 to the concentrated water port 18.

The filter 26 includes a first filter cap 52 and a second filter cap 54. The first filter cap 52 is installed at the upper end of the filter 26 and prevents mixing of the feedwater, which flows from the feedwater port 14 past the upper end of the filter 26, and the concentrated water that is discharged from the filter 26 via the concentrated flow channel 50 into the concentrated water port 18. The second filter cap 54 is installed at the lower end of the filter 26 and prevents mixing of the concentrated water which flows into the central tube 28 and the concentrated water pipe 46 at the lower end of the filter 26 with the feedwater which is flowing radially into the filter 26 about the lower end.

As shown in FIG. 2, the filter assembly 30 includes a plurality of carbon fiber cloth strips 60 interleaved with folded membrane assemblies 62 in an alternating pattern. The folded membrane assemblies 62 are water permeable. The carbon fiber cloth strips 60 are activated carbon fiber cloth strips and are utilized for carbon filtering, as discussed in greater detail below. The carbon fiber cloth strips 60 have a thickness of 0.2 millimeters to 0.6 millimeters at atmospheric pressure and are configured to transmit a flow of permeate water in a direction perpendicular to the thickness direction of the carbon fiber cloth strips 60. Written another way, the permeate flows spirally inward along the carbon fiber cloth strips 60 towards the central tube 28. In some embodiments, the strips are formed of a non-woven and/or felt construction.

The embodiment shown in FIG. 2 includes three carbon fiber cloth strips 60 with a first folded membrane assembly 62 located between the first and second carbon fiber cloth strips 60 and a second folded membrane assembly 62 located between the second and third carbon fiber cloth strips 60. An outer surface 56 of each folded membrane assembly 62 is disposed against adjacent carbon fiber cloth strips 60. Other embodiments may utilize more than two, four, five, or more carbon fiber cloth strips 60 with folded membrane assemblies 62 located between adjacent carbon fiber cloth strips 60. The carbon fiber cloth strips 60 form a carbon prefilter 110 and a carbon postfilter 120 and the folded membrane assembly forms a reverse osmosis filter 130, as discussed below in greater detail with respect to FIG. 7.

As shown in FIG. 3, each folded membrane assembly 62 includes a reverse osmosis membrane sheet 64 that is folded in half, defining a fold 66 that is perpendicular to the length of the membrane sheet 64, such that the folded length of the membrane sheet 64 is approximately half of the unfolded length. The fold 66 effectively alters the configuration of the membrane sheet 64 into two effective membrane sheets 64A, 64B that are connected by the fold 66 and sandwich a feedwater net 68 therebetween. Referring back to FIG. 2, the fold 66 additionally forms an inner channel 58 that provides a feedwater flow path of the reverse osmosis filter 130.

As illustrated in FIG. 2 the outer surface 56 of the folded membrane sheet 64 is (or the opposing outer surfaces 56 of the effective membrane sheets 64A, 64B are) disposed against the adjacent carbon fiber cloth strips 60, with the outer surface 56 of the lower membrane sheet 64A being disposed against a first carbon fiber cloth strip 60 located below the folded membrane assembly 62 and the outer surface 56 of the upper membrane sheet 64B being disposed against a second carbon fiber cloth strip 60 located above the folded membrane assembly 62. The interleaved carbon fiber cloth strips 60 and membrane assemblies 62 are subsequently rolled around the central tube 28. Accordingly, the uppermost one of the carbon fiber cloth strips 60 in FIG. 2 can optionally be eliminated, as the outer surface of the bottom carbon fiber cloth strips 60 be disposed against the outer surface of the uppermost folded membrane assembly 62 during the rolling.

Figure 4:
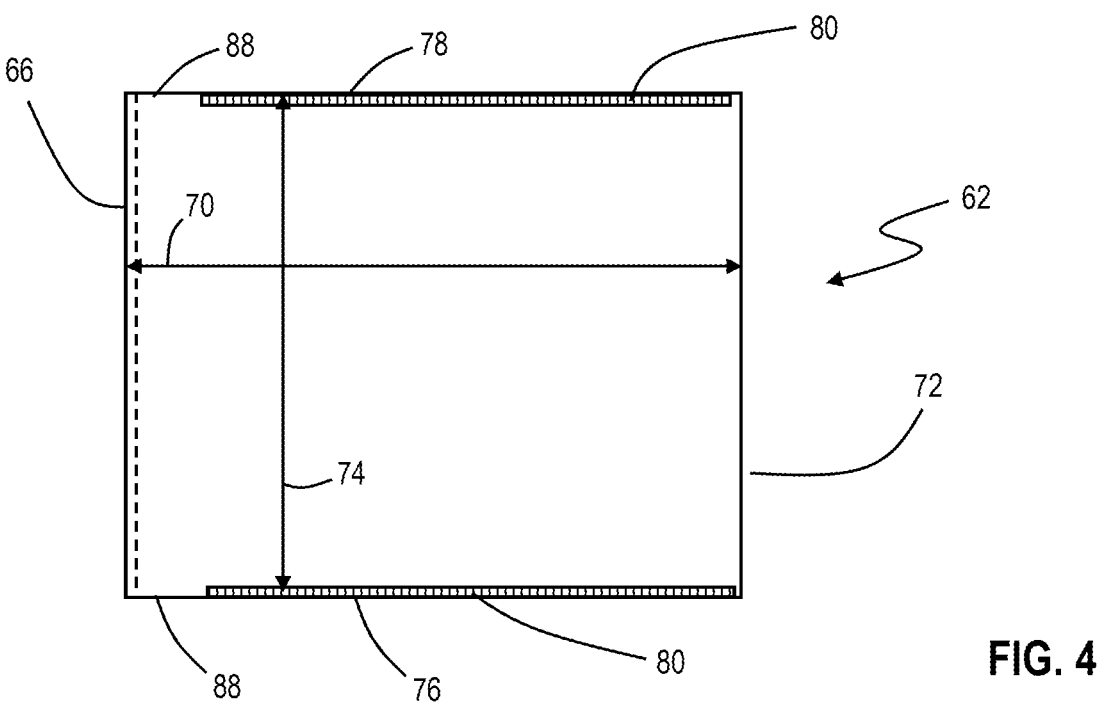
FIG. 4 is a top view of the membrane assembly of FIG. 3 in an unrolled, folded state.

FIG. 4 illustrates the folded membrane assembly 62 when folded. As shown, the folded membrane assembly 62 has a length 70 extending between the fold 66 and an open end 72 opposite the fold 66. The open end 72 is defined by the overlapping lengthwise extents of the unfolded membrane sheet 64, now folded over one another. The width 74 of the folded membrane assembly is perpendicular to the length 70 and extends between two perpendicular edges, a first edge 76 and a second edge 78. In some embodiments, the perpendicular edges 76, 78 are sealed via an adhesive 80. The adhesive seal 80 extends along the length 70 of the folded membrane assembly 62 and closes at least a portion of the edges 76, 78. In some embodiments, the adhesive seal 80 runs across a majority of the entire length 70 of the folded membrane assembly 62 along the edges 76, 78. In some embodiments, the adhesive seal does not extend along the full length 70 of the folded membrane assembly 62. As shown in FIG. 4, the adhesive seal 80 terminates prior to the fold 66 to define a concentrate exit 88 between the fold and the adhesive seal 80.

Figure 5:
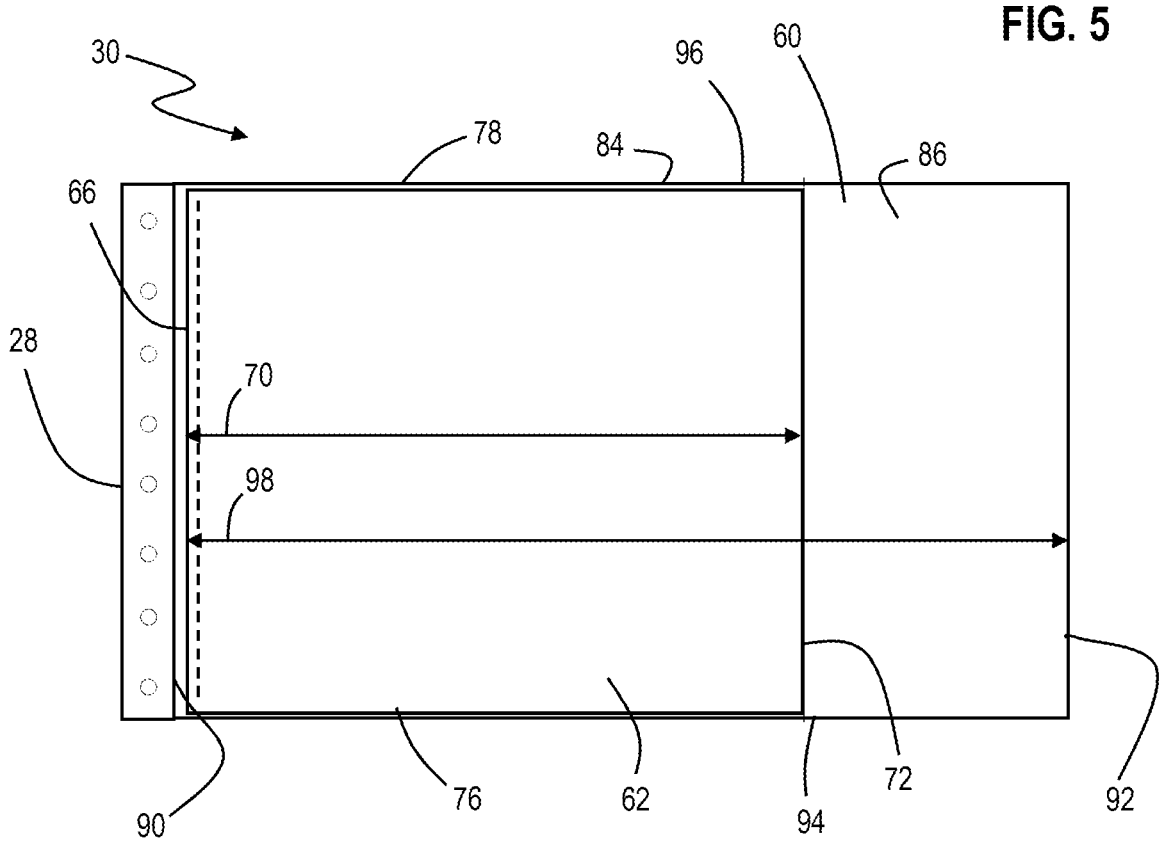
FIG. 5 is a top view of the membrane assembly of FIG. 3 in an unrolled, folded state shown adjacent one of the unrolled continuous strips of carbon fiber cloth and the central tube.

FIG. 5 illustrates one of the folded membrane assemblies 62 positioned relative to the central tube 28 and relative to one of the carbon fiber cloth strips 60. This arrangement is an intermediate pre-rolled assembly step in interleaving the folded membrane assemblies 62 and the carbon fiber cloth strips 60. As shown, the folded membrane assembly has a similar width as the carbon fiber cloth strip 60 but has a shorter length 70 than the length 98 of the carbon fiber cloth strip 60. As such, the carbon fiber cloth strip 60 has a first portion 84 that is substantially covered by the folded membrane assembly 62 (i.e., disposed against the outer surface 56 of the folded membrane assembly 62) and a second portion 86 that is not covered by the folded membrane assembly 62 when stacked as shown. The first portion 84 at least partially forms the carbon postfilter 120 and the second portion 86 at least partially forms the carbon prefilter 110, as discussed in greater detail below with respect to FIG. 7.

As shown in FIGS. 2 and 5, a first edge 90 of the carbon fiber cloth strip 60 (also referred to as a proximal edge) is joined to the central tube 28. A second edge 92 of the carbon fiber cloth strip 60 (also referred to as a distal edge) is parallel to and spaced apart from the first edge 90. A third edge 94 extends between ends of the first and second edges 90, 92, and a fourth edge 96 is parallel to and spaced apart from the third edge 94 and extends between the first and second edges 90, 92.

With continued reference to FIG. 5, the folded membrane assembly 62 is positioned adjacent to the central tube 28, with the fold 66 positioned adjacent to the first edge 90 of the carbon fiber cloth strip 60. As such, the first portion 84 of the carbon fiber cloth strip 60, the portion covered by the folded membrane assembly 62, is located adjacent to the central tube 28 and is located between the central tube 28 and the second portion 86 of the carbon fiber cloth strip 60 in the pre-rolled arrangement, as shown. Because the first portion 84 of the carbon fiber cloth strip 60 is closer to the central tube 28, it may alternatively be referred to as the "proximal" portion, and the second portion 86 which is further away from the central tube 28 and includes a free end of the carbon fiber cloth strip 60 may alternatively be referred to as the "distal" portion of the carbon fiber cloth strip 60.

Figures 6, 7:
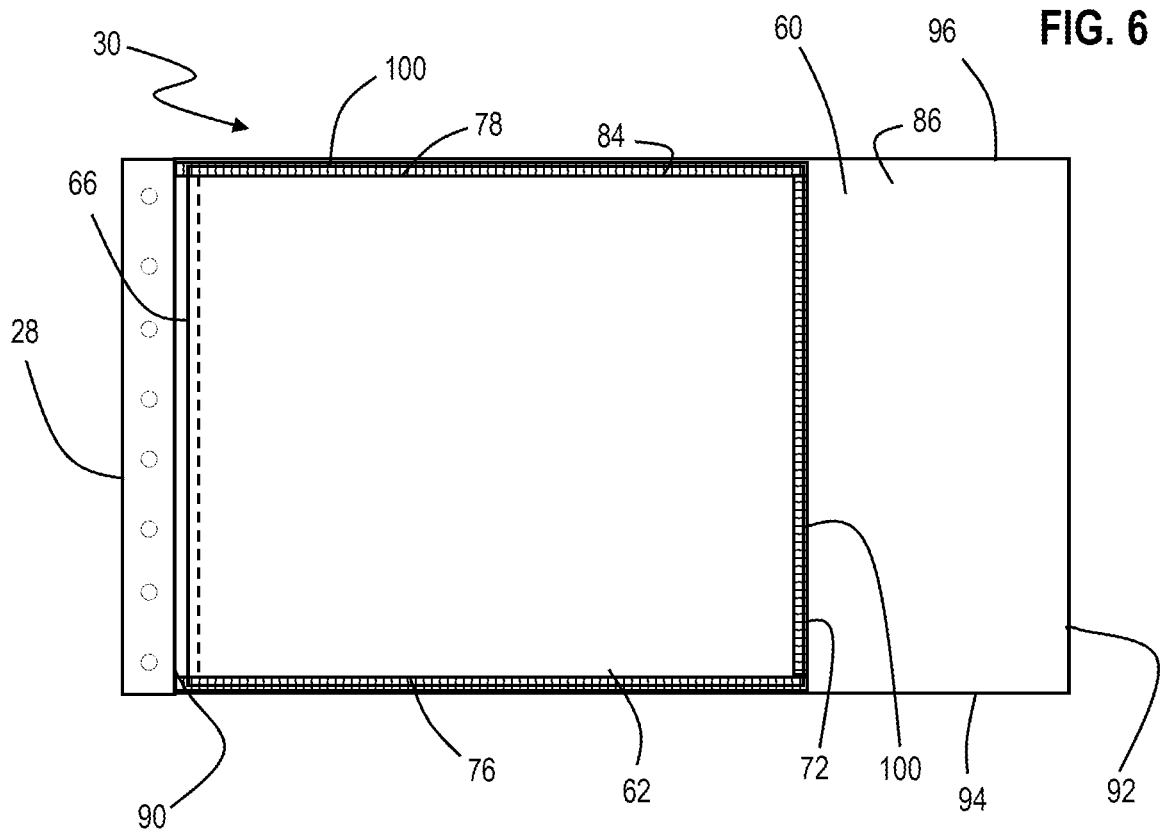
FIG. 6 is a top view of the assembly shown in FIG. 5 with an adhesive seal formed at edges of the unrolled, folded membrane assembly.
FIG. 7 is an end view of the cartridge filter of FIG. 2.

As shown in FIG. 6, an adhesive seal 100 is applied between the folded membrane assembly 62 and the adjacent carbon fiber cloth strip 60. More specifically, the adhesive seal couples the first edges 76 of the folded membrane assembly 62 to the adjacent third edges 94 of the carbon fiber cloth strips 60 and couples the second edges 78 of the folded membrane assembly 62 to the adjacent fourth edges 96 of the carbon fiber cloth strips 60. Additionally, the open ends 72 of the folded membrane assembly 62 are coupled to the adjacent carbon fiber cloth strips 60 via the adhesive seal 100 to prevent direct fluid flow between the first and second portions 84, 86 of the carbon fiber cloth strips 60. In other words, the adhesive seals 100 secure the folded membrane assembly 62 to the carbon fiber cloth strip 60 such that the folded membrane assembly 62 separates water adjacent the carbon postfilter 120 (the first portion 84 of the carbon fiber cloth strip 60) from water adjacent the carbon prefilter 110 (the second portion 86 the carbon fiber cloth strip 60). The open end 72 remains open to function as a flow path entrance opposite the fold 66. The flow path entrance is open to (i.e., the open end 72 is open to) the carbon prefilter 110 to receive feedwater therefrom. In combination with the adhesive 80 shown in FIG. 4, the adhesive joint 100 seals along three edges 72, 76, 78 to form an outer channel 82 (FIG. 2) that provides a permeate flow path for the reverse osmosis filter 130 and a flow path for the carbon postfilter 120.

As shown in FIGS. 1, 2, and 7, the filter assembly 30 is wrapped about the central tube 28. More specifically, the filter assembly is wrapped in an overlapping and spiraling direction to extend radially outward from the central tube 28. With the multiple alternating layers of carbon fiber cloth strips 60 and folded membrane assemblies 62 stacked atop one another and coupled to one another, as described above, and with the first edges 90 of the carbon fiber cloth strips 60 coupled to the central tube 28, the filter assembly is wrapped tightly (e.g., in a counter-clockwise direction as shown in FIG. 2), about the central tube, overlapping itself multiple times. With the first portion 84 of the carbon fiber cloth strips 60 being located nearer the first edge 90 that is coupled to the central tube 28, the first portion 84 wraps about the central tube 28 before the second portion 86. The first portion 84 is therefore located radially inward of the second portion 86 when the filter assembly 30 is wrapped about the central tube 28. In some embodiments, the second portion 86 is sized such that the second portion makes at least three full rotations about the first portion 84 when wrapped about the central tube 28. Written another way, the second portion 86 has an unwrapped length that is at least three times greater than the circumference of the first portion 84 when wrapped about the central tube 28.

As shown in FIG. 7, the radially outer portion of the filter assembly 30, defined only by the second portion 86 of the carbon fiber cloth strips 60, forms the carbon prefilter 110.

The radially inner portion of the filter assembly 30 includes the interleaved carbon fiber cloth strips 60 (specifically, the first portions 84 of the carbon fiber cloth strips 60) and the folded membrane assemblies 62. The radially inner portion of the filter assembly 30 is located between the carbon prefilter 110 and the central tube 28 and is the carbon postfilter 120 and the reverse osmosis filter 130. The carbon postfilter 120 is integrated within the permeate side of the reverse osmosis filter 130. The permeate side of the reverse osmosis filter 130 only includes the first portions 84 of the carbon fiber cloth strips 60, each of the carbon fiber cloth strips 60 being arranged between spaced-apart folded membrane assemblies 62. The wrapped, spiraling arrangement of the filter assembly 30 directs flow from the feedwater inlet 14 not only radially inwardly through the filter assembly 30, but more specifically in an inwardly spiraling direction.

To assemble the cartridge filter 10 and form the carbon prefilter 110, reverse osmosis filter 130, and carbon postfilter 120 around the central tube 28, a plurality of activated carbon fiber cloth strips 60 are prepared. The multiple carbon fiber cloth strips 60 are stacked and adjacent first edges 90 of each of the plurality of carbon fiber cloth strips 60 are joined to the central tube 28 with a set of through holes 36 between adjacent carbon fiber cloth strips 60. Second edges 92, opposite the first edges 90 are therefore spaced apart from the central tube 28. The folded membrane assemblies 62, which each include a feedwater net 68, are interleaved with the carbon fiber cloth strips 60 such that the folds 66 of the folded membrane assemblies 62 are located adjacent to the central tube 28 (with the opposing open ends 72 therefore located between the folds 66 and the second edges 92. In some embodiments, at least a portion, but less than the entirety, of an edge 76, 78 of each of the folded membrane assemblies 62 is sealed via an adhesive sealer 80.

With the carbon fiber cloth strips 60 and folded membrane assemblies 62 interleaved to form an alternating pattern, the parallel edges 94, 96 of the carbon fiber cloth strips 60 that connect the first and second edges 90, 92 of the cloth strips are coupled to adjacent folded membrane assemblies 62 with an adhesive sealer 100. Additionally, the open ends 72 of the folded membrane assemblies 62 are coupled to the adjacent carbon fiber cloth strips 60 via the adhesive sealer 100. With the adhesive sealer 100 coupling the layers together, the filter assembly 30 is spirally wrapped around the central tube 28. First the folded membrane assemblies 62 and the portions 84 of the carbon fiber cloth strips 60 located between the first edges 90 and the (sealed) open ends 72 are wrapped around the central tube 28 to form an integrated reverse osmosis filter 130 and carbon postfilter 120. Then, the portions 86 of the carbon fiber cloth strips 60 located between the (sealed) open ends 72 and the second edges 92 are wrapped around the central tube 28 and around the integrated reverse osmosis filter 130 and carbon postfilter 120 to form a carbon prefilter 110. In some embodiments, to generate a carbon prefilter 110 with a substantive thickness, the portions 86 that wrap about the reverse osmosis filter 130 and carbon postfilter 120 complete at least three full rotations.

With the filter assembly 30 assembled to the central tube 28 and the carbon prefilter 110, reverse osmosis filter 130, and carbon postfilter 120 formed, the filter assembly 30 and central tube 28 are inserted into the cartridge housing 12 such that the feedwater inlet 14 provides a fluid flow path between the feedwater inlet 14 and the outer periphery of the carbon prefilter 110.

Figure 8:
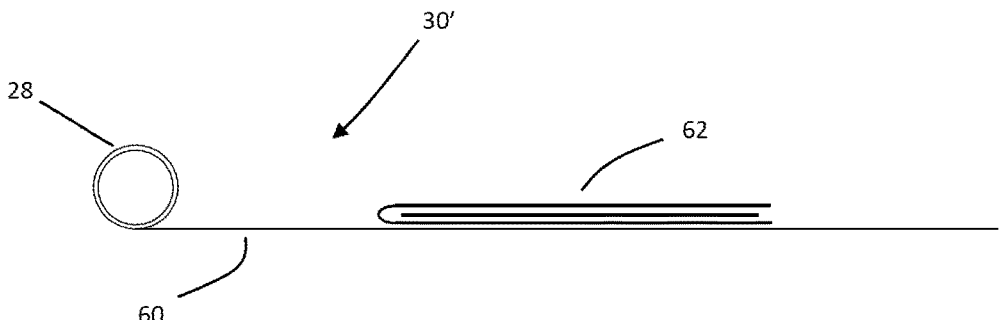
FIG. 8 is a schematic end view of a partially disassembled cartridge filter illustrating a single folded membrane assembly and a single continuous strip of carbon fiber cloth in the cartridge filter.

FIG. 8 depicts an alternative construction 30' of the cartridge filter of FIGS. 1-7. The cartridge filter 30' is constructed using a single continuous carbon fiber cloth strip 60 and folded membrane assembly 62, which are wrapped around the central tube 28 to form the combined prefilter 110, reverse osmosis filter 130, and carbon postfilter 120.

Figure 9:
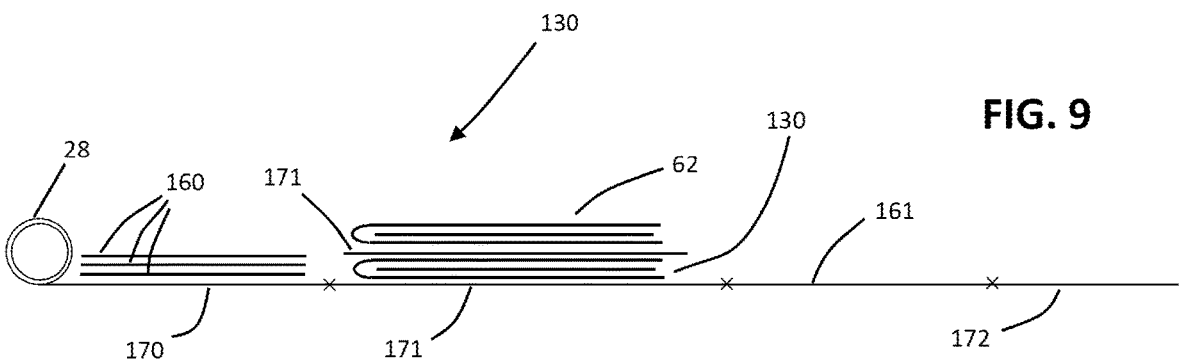
FIG. 9 is a schematic end view of a partially disassembled cartridge filter according to another embodiment.
Figure 10:
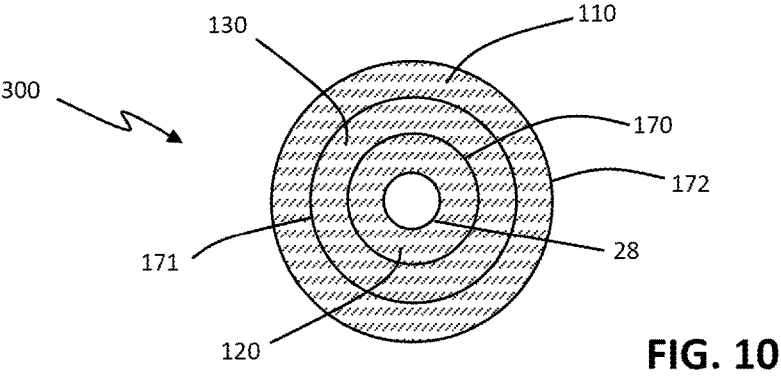
FIG. 10 is an end view of the cartridge filter of FIG. 9.

FIGS. 9 and 10 depict a cartridge filter 300 according to another embodiment. The cartridge filter 300 is constructed in a somewhat similar manner to the cartridge filter 30, again using folded membrane assemblies 62 and a central tube 28. The cartridge filter 300 uses a long, continuous multipiece sheet that wraps around the central tube 28 and that is constructed of a first strip 170, a second strip 171, a third strip 161, and a fourth strip 172. A first end (a free end, i.e. not the end that is joined to the second strip 171) of the first strip 170 is joined to the center tube 28, and a second end of the first strip 170 is joined to a first end of the second strip 171. A second end of the second strip 171 is joined to a first end of the third strip 161, and a second end of the third strip 161 is joined to a first end of the fourth strip 172. A second end of the fourth strip 172 is a free end.

The first through fourth strips can be joined together by slightly overlapping the ends of the adjacent portions, and creating joints between the overlapping ends. The joints can be made by, for example, an adhesive.

One or more (three are shown) carbon fiber cloth strips 160 are laid on top of the first strip 170, so that during the winding of the filter assembly 300 around the central tube 28 the one or more cloth strips 160 form an inner core that functions as a postfilter 120, as shown in FIG. 10. The carbon fiber cloth strips are preferably made of an activated carbon, for example an activated carbon that is designed to remove volatile organic compounds (VOCs) from permeate water. The first portion 170 of the multipiece is constructed of a thin, water-permeable material to allow water to flow radially inward into the postfilter 120. By way of example, the first portion 170 can be formed of polyethylene tereph-thalate (PET). The number of carbon fiber cloth strips 160 used to form the postfilter 120 can be selected such that the postfilter 120 is of sufficient size for removing contaminants such as VOCs from the water.

One or more (two are shown) folded membrane assemblies 62 are laid on top of the second strip 171, so that during the winding of the filter assembly 300 around the central tube 28 the one or more membrane assemblies 62 define a reverse osmosis filter section 130 arranged radially between a prefilter 110 and the postfilter 120, as shown in FIG. 10. The second continuous strip 171 is formed from a tricot material as typically found in reverse osmosis filters, to enable the efficient distribution of water to the outer surface 56 of the membrane assembly 62. As shown in FIG. 9, additional sheets 171 are used to separate adjacent ones of the membrane assemblies 62.

The third strip 161 is formed of a carbon fiber cloth material, and wraps around the reverse osmosis filter 130 to at least partially form a prefilter 110. The carbon fiber cloth material used to create the third strip 161 can be the same as the material used to create the cloth strips 160 of the postfilter 120, or can be of a different material that is more specifically suited to the prefiltering of water as opposed to postfiltering. The length of the third strip 161 can be selected so that the prefilter is of the desired size. By way of example, the length can be such that the third strip 161 forms three complete revolutions around the reverse osmosis filter. As the prefilter is located radially outward from the postfilter 120 and the reverse osmosis filter 130, the flow area for the water flowing radially inward through the prefilter 110 is substantially greater than the flow area through the postfilter 120, and a single strip 161 can be used to create the prefilter

110. In other alternative embodiments, additional carbon fiber cloth strips can be laid on top of the third strip 161 in a similar fashion to the strips 160 of the postfilter 120 in order to form a larger prefilter 110. The carbon fiber cloth material from which the third strip 161 is constructed is preferably an activated carbon, for example an activated carbon that is designed to remove chlorine or chloramine.

The fourth strip 172 is wrapped around the third strip 161 to also form part of the prefilter 110. The fourth strip 172 can be formed of, for example, polypropylene, so that it functions as a sediment prefilter that prevents large (for example, in the range to 2-100 microns) particles from passing into the carbon cloth portion of the prefilter. The fourth strip and the third strip, when wound around the reverse osmosis filter, thereby together define the prefilter 110.

As the cartridge filter 300 is wrapped around the central tube 28, the continuous sheet formed from the strips 170, 171, 161, and 172 forms a continuous spiral sheet that extends through the cartridge filter. The strip 170 is a first end portion of the continuous spiral sheet, and serves to separate the postfilter 120 from the reverse osmosis filter 130, as shown in FIG. 10. The fourth strip 172 is a second end portion of the continuous spiral sheet, and forms an outer wrap of the filter assembly 300 in addition to functioning as a sediment filter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of making a cartridge filter containing a prefilter, a reverse osmosis filter, and a postfilter, the method comprising:

constructing a continuous sheet having a first portion, a second portion joined to the first portion, and a third portion joined to the second portion;

disposing a plurality of carbon fiber cloth strips over the first portion;

providing at least one folded membrane assembly having a feedwater net arranged within a folded-over reverse osmosis membrane;

disposing the at least one folded membrane assembly over the second portion;

joining a free end of the first portion to a tube;

spirally winding around the tube the first portion and the plurality of carbon fiber cloth strips to form the post-filter;

spirally winding around the postfilter the second portion and the at least one folded membrane assembly to form the reverse osmosis filter; and spirally winding around the reverse osmosis filter the third portion to at least partially form the prefilter.

2. The method of claim 1, wherein the third portion is constructed of activated carbon cloth.

3. The method of claim 1, wherein constructing the continuous sheet comprises joining the first portion to the second portion with adhesive and joining the second portion to the third portion with adhesive.

4. The method of claim 1, wherein the continuous sheet additionally has a fourth portion joined to the third portion and wherein the method further comprises spirally winding the fourth portion around the third portion to partially form the prefilter.

5. The method of claim 4, wherein the fourth portion at least partially defines the prefilter.

6. The method of claim 4, wherein the fourth portion is constructed of polypropylene.

7. The method of claim 1, wherein disposing the at least one folded membrane assembly over the second portion comprises placing a folded end of the at least one folded membrane assembly adjacent to where the second portion is joined to the first portion and placing an open end of the at least one folded membrane assembly adjacent to where the second portion is joined to the third portion.

8. The method of claim 7, further comprising sealing at least a portion, but less than the entirety, of an edge of the at least one folded membrane assembly, said edge extending between the folded end and the open end.

9. The method of claim 1, further comprising inserting the prefilter, reverse osmosis filter, and postfilter into a cartridge having a feedwater inlet so as to provide a fluid flow path between the feedwater inlet and an outer periphery of the prefilter.

10. A method of making a cartridge filter containing a prefilter, a reverse osmosis filter, and a postfilter, the method comprising:

providing a plurality of activated carbon fiber cloth strips, each having a first edge, a second edge parallel to and spaced apart from the first edge, a third edge extending between ends of the first and second edges, and a fourth edge parallel to and spaced apart from the third edge and extending between the first and second edges;

joining the first edges of the plurality of activated carbon fiber cloth strips to a tube;

providing a plurality of folded membrane assemblies, each folded membrane assembly having a feedwater net arranged within a folded-over reverse osmosis membrane;

interleaving the plurality of folded membrane assemblies with the plurality of activated carbon fiber cloth strips such that folded ends of the folded membrane assemblies are located adjacent to the tube and open ends of the folded membrane assemblies opposite the folded ends are located between the folded ends and the second edges;

sealing the third and fourth edges of the activated carbon fiber cloth strips to adjacent ones of the plurality of folded membrane assemblies between the folded ends and the open ends of the folded membrane assemblies;

sealing the activated carbon fiber cloth strips to adjacent ones of the plurality of folded membrane assemblies along the open ends of the folded membrane assemblies;

spirally winding around the tube the plurality of folded membrane assemblies and those portions of the plurality of activated carbon fiber cloth strips located between the first edges and the open ends to form an integrated reverse osmosis filter and postfilter; and spirally winding those portions of the plurality of activated carbon fiber cloth strips located between the open ends and the second edges around the integrated reverse osmosis filter and carbon postfilter to form a prefilter.

11. The method of claim 10, wherein those portions of the plurality of activated carbon fiber cloth strips located between the open ends and the second edges are spirally wound around the integrated reverse osmosis filter and postfilter for at least three complete revolutions.

12. The method of claim 10, further comprising sealing at least a portion, but less than the entirety, of an edge of each of the folded membrane assemblies, said edge extending between the folded end and the open end.

13. The method of claim 10, further comprising inserting the prefilter, reverse osmosis filter, and postfilter into a cartridge having a feedwater inlet so as to provide a fluid flow path between the feedwater inlet and an outer periphery of the prefilter.

\* \* \* \* \*